(12) United States Patent
Lee et al.

(10) Patent No.: US 8,340,034 B1
(45) Date of Patent: Dec. 25, 2012

(54) BLUETOOTH AND WIRELESS LAN ARBITRATION

(75) Inventors: George Lee, San Jose, CA (US); Gladys Yuen Yan Wong, Fremont, CA (US); Timothy Li, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 326 days.

(21) Appl. No.: 12/616,454

(22) Filed: Nov. 11, 2009

(51) Int. Cl.
*H04W 4/00* (2009.01)
*H04B 7/00* (2006.01)

(52) U.S. Cl. .................. 370/329; 370/338; 455/41.2

(58) Field of Classification Search .......... 455/419–420, 455/41.2, 552.1, 553.1, 74.1; 370/276, 310, 370/314, 331, 338, 395.4, 395.42, 395.5, 370/401, 431, 442–449, 458, 462, 465–468, 370/470–474, 328, 329
See application file for complete search history.

(56) References Cited

U.S. PATENT DOCUMENTS

| | | | |
|---|---|---|---|
| 4,337,463 A | 6/1982 | Vangen | |
| 7,239,882 B1 | 7/2007 | Cook | |
| 7,342,895 B2 | 3/2008 | Serpa et al. | |
| 7,595,768 B2 * | 9/2009 | Li et al. ........................ | 343/893 |
| 7,957,340 B2 | 6/2011 | Choi et al. | |
| 7,966,036 B2 | 6/2011 | Kojima | |
| 8,072,913 B2 * | 12/2011 | Desai ........................... | 370/311 |
| 8,078,111 B2 | 12/2011 | Jovicic et al. | |
| 8,229,087 B2 | 7/2012 | Sumioka et al. | |
| 8,254,296 B1 | 8/2012 | Lambert | |
| 2004/0192222 A1 * | 9/2004 | Vaisanen et al. ................ | 455/78 |
| 2005/0174962 A1 | 8/2005 | Gurevich | |
| 2006/0079232 A1 | 4/2006 | Omori et al. | |
| 2006/0268756 A1 | 11/2006 | Wang et al. | |
| 2007/0014314 A1 | 1/2007 | O'Neil | |
| 2007/0223430 A1 | 9/2007 | Desai et al. | |
| 2008/0139212 A1 | 6/2008 | Chen et al. | |
| 2008/0161031 A1 | 7/2008 | Tu | |
| 2008/0181154 A1 | 7/2008 | Sherman | |
| 2008/0232287 A1 | 9/2008 | Shao et al. | |
| 2009/0196210 A1 * | 8/2009 | Desai ........................... | 370/311 |
| 2009/0239471 A1 * | 9/2009 | Tran et al. .................... | 455/41.2 |
| 2009/0247217 A1 * | 10/2009 | Hsu et al. ..................... | 455/553.1 |
| 2010/0069112 A1 * | 3/2010 | Sun et al. ..................... | 455/553.1 |
| 2010/0130129 A1 * | 5/2010 | Chang et al. ................. | 455/41.2 |
| 2010/0316027 A1 * | 12/2010 | Rick et al. .................... | 370/336 |
| 2011/0007675 A1 * | 1/2011 | Chiou et al. .................. | 370/297 |
| 2011/0009074 A1 * | 1/2011 | Hsu et al. ..................... | 455/73 |

OTHER PUBLICATIONS

"Non-Final Office Action", U.S. Appl. No. 12/484,563, (Oct. 4, 2011), 13 pages.
"Final Office Action", U.S. Appl. No. 12/484,563, (Apr. 24, 2012), 18 pages.
"Notice of Allowance", U.S. Appl. No. 12/716,569, (Apr. 19, 2012), 7 pages.
"Non-Final Office Action", U.S. Appl. No. 12/732,036, Aug. 9, 2012, 13 pages.

(Continued)

*Primary Examiner* — Habte Mered

(57) ABSTRACT

Bluetooth and wireless LAN arbitration is described. In embodiments, a communication device includes a Bluetooth device for Bluetooth communication according to Bluetooth protocol, and includes a wireless LAN device for network communication according to wireless network protocol. An antenna switching circuit connects the Bluetooth device to an antenna for the Bluetooth communication, and connects the wireless LAN device to the antenna for the network communication. An arbitration control system arbitrates when the Bluetooth device is connected to the antenna via the antenna switching circuit and when the wireless LAN device is connected to the antenna via the antenna switching circuit.

20 Claims, 5 Drawing Sheets

OTHER PUBLICATIONS

"Notice of Allowance", U.S. Appl. No. 12/484,563, Jul. 9, 2012, 6 pages.

"Supplemental Notice of Allowance", U.S. Appl. No. 12/716,569, Jul. 23, 2012, 2 pages.

* cited by examiner

US 8,340,034 B1

BLUETOOTH AND WIRELESS LAN ARBITRATION

BACKGROUND

System-on-chip (SoC) integrated circuits are being utilized in smaller and/or increasingly complex consumer electronic devices, such as cell phones, media players, digital cameras, network equipment, television client devices, and the like. Typically, all or most of the electronic circuitry, one or more microprocessors, memory, input-output logic control, communication interfaces and components, and other hardware, firmware, and/or software to run a device can be integrated within an SoC. An SoC designed for a communication device or portable computer device can be implemented to include both a Bluetooth device for short-range wireless communication, and a wireless LAN communication device for local area network wireless communication. Because a Bluetooth device and a wireless LAN device operate within the same frequencies, communications from one device can interfere with the other device. Additionally, the communications associated with one device may override and/or cancel out the communications associated with the other device.

SUMMARY

This summary introduces concepts of Bluetooth and wireless LAN arbitration, and the concepts are further described below in the Detailed Description. Accordingly, the summary should not be considered to identify essential features nor used to limit the scope of the claimed subject matter.

In embodiments of Bluetooth and wireless LAN arbitration, a communication device includes a Bluetooth device for Bluetooth communication according to Bluetooth protocol, and includes a wireless LAN device for network communication according to wireless network protocol. An antenna switching circuit connects the Bluetooth device to an antenna for the Bluetooth communication, and connects the wireless LAN device to the antenna for the network communication. An arbitration control system arbitrates when the Bluetooth device is connected to the antenna via the antenna switching circuit and when the wireless LAN device is connected to the antenna via the antenna switching circuit.

In other embodiments, a method is implemented to connect a Bluetooth device to an antenna of a communication device for Bluetooth communication according to Bluetooth protocol; connect a wireless LAN device to the antenna of the communication device for network communication according to wireless network protocol; and arbitrate when the Bluetooth device is connected to the antenna for the Bluetooth communication and when the wireless LAN device is connected to the antenna for the network communication.

BRIEF DESCRIPTION OF THE DRAWINGS

Embodiments of Bluetooth and wireless LAN arbitration are described with reference to the following drawings. The same numbers are used throughout the drawings to reference like features and components.

DETAILED DESCRIPTION

The present disclosure describes techniques to arbitrate between two different communication schemes—e.g., Bluetooth and wireless LAN communications. The arbitration facilitates coexistence and timesharing between a Bluetooth device and a wireless LAN device that are both implemented in a communication device, such as a portable phone and/or computer device. A communication device that implements both Bluetooth and wireless LAN communication devices includes an arbitration control system that initiates and manages the various arbitration techniques, such as slave packet suppression, an inverted sniff, an asynchronous control link boundary, and/or an antenna lock to arbitrate between Bluetooth and wireless LAN communications.

While features and concepts of the described systems and methods for Bluetooth and wireless LAN arbitration can be implemented in any number of different environments, systems, networks, and/or various configurations, embodiments of Bluetooth and wireless LAN arbitration are described in the context of the following example environments.

Figure 1:
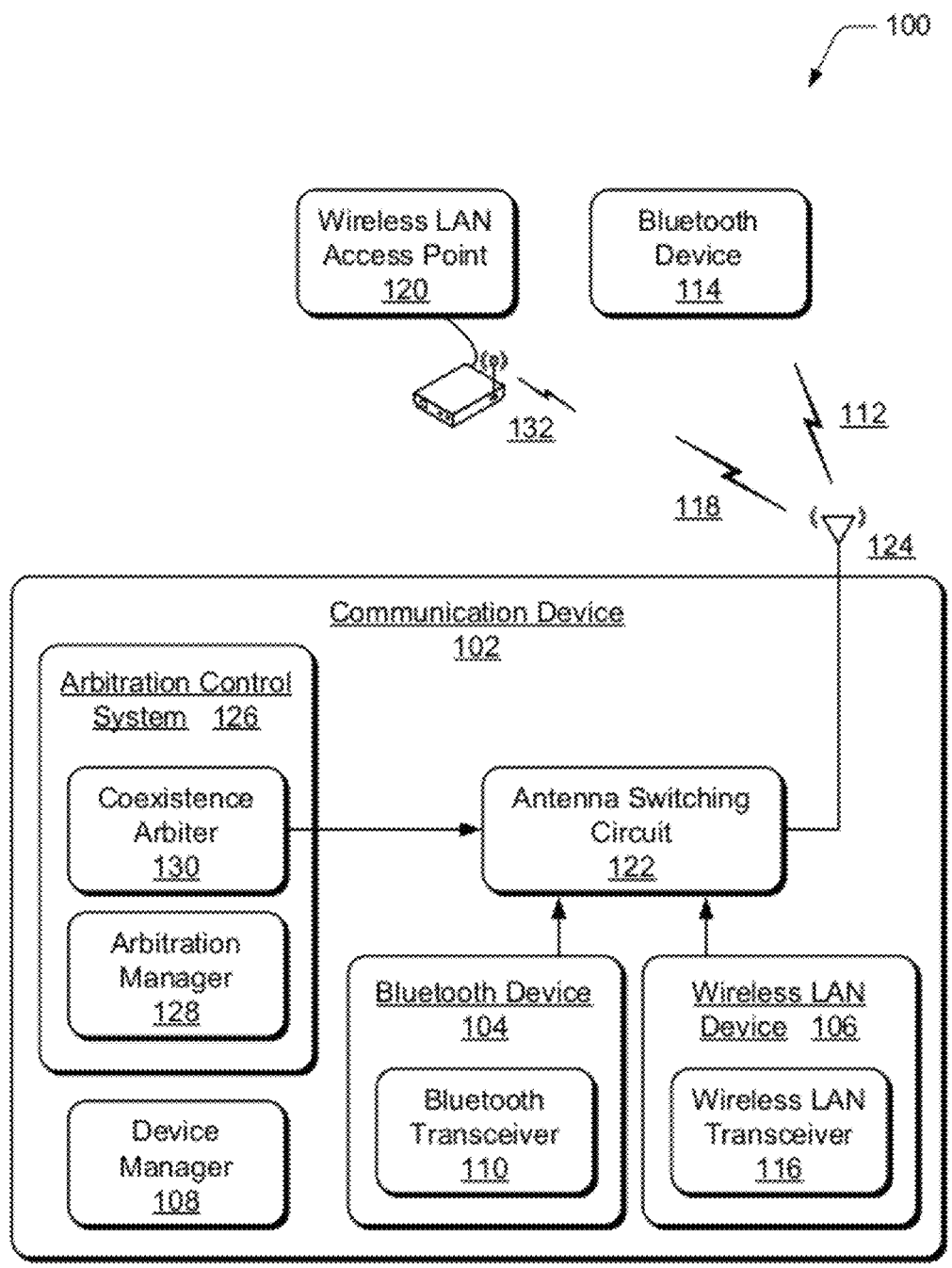
FIG. 1 illustrates an example communication system.

FIG. 1 illustrates an example communication system 100 in which embodiments of Bluetooth and wireless LAN arbitration can be implemented. Example system 100 includes a communication device 102 that is implemented with a Bluetooth device 104 for Bluetooth communication according to a Bluetooth protocol for wireless communication via a short-range wireless connection. The communication device 102 is also be implemented with a wireless LAN device 106 for network communication according to a wireless network protocol (e.g., the IEEE 802.11 group of standards specify wireless LAN communication—for example 802.11a, 802.11b, 802.11g, 802.11n, 802.11 legacy, 802.11ad, and so on).

Communication device 102 can be implemented as any one or combination of a media device, communication device, computer device, gaming device, appliance device, electronic device, portable phone (e.g., cellular, VoIP, WiFi, etc.), and/or as any other type of device that includes wireless communication functionality. Communication device 102 can include various components to enable wired and/or wireless communications, as well as one or more processors (e.g., any of microprocessors, controllers, and the like), communication components, data inputs, memory components, processing and control circuits, and/or any combination of the differing components as described with reference to the example device shown in FIG. 5.

In this example, communication device 102 includes a device manager 108 (e.g., a control application, software application, signal processing and control module, code that is native to a particular device, a hardware abstraction layer for a particular device, etc.). Communication device 102 may also be associated with a user (i.e., a person) and/or an entity that operates the device such that a device describes logical devices that include users, software, firmware, and/or a combination of devices.

The Bluetooth device 104 of communication device 102 includes a Bluetooth transceiver 110 for Bluetooth communication 112 with an additional Bluetooth-enabled communication device 114. For example, communication device 102 can be a cellular phone that implements Bluetooth (e.g., Bluetooth device 104) to communicate with a wireless headset or earpiece (e.g., Bluetooth device 114). The Bluetooth device 104 may also include other components, such as a digital signal processor (not shown) to process Bluetooth signals in conformance with a Bluetooth protocol, and can include a Bluetooth baseband (not shown) that is implemented to control sniff timing.

The wireless LAN device 106 of communication device 102 includes a wireless LAN transceiver 116 for network communication 118 with a wireless LAN access point 120 of a wireless LAN system. The wireless LAN device 106 may also include other components, such as a baseband processor (BBP) and a media access controller (MAC) (not shown). A baseband processor is implemented to process signals, to include encoding and decoding, as well as error correction. A MAC is implemented to process received and/or transmitted signals.

Communication device 102 includes an antenna switching circuit 122 that is implemented to connect the Bluetooth device 104 to an antenna 124 for Bluetooth communication 112, and/or connect the wireless LAN device 106 to the antenna 124 for network communication 118. In an embodiment, the antenna switching circuit 122 is utilized to arbitrate between Bluetooth and wireless LAN communications. Alternatively and/or in addition, the antenna switching circuit 122 is implemented for approximate simultaneous Bluetooth transmission and wireless LAN reception, Bluetooth transmission and wireless LAN transmission, Bluetooth reception and wireless LAN reception, and/or Bluetooth reception and wireless LAN transmission. In various embodiments, the antenna switching circuit 122 can be implemented as described with reference to the example antenna switching circuit shown in FIG. 2.

In this example, communication device 102 also includes an arbitration control system 126 that may be implemented as computer-executable instructions maintained by a memory and executed by a processor to implement embodiments of Bluetooth and wireless LAN arbitration. In various embodiments, the arbitration control system 126 may be implemented as hardware, software, firmware, or any combination thereof to arbitrate when the Bluetooth device 104 is connected to the antenna 124 via the antenna switching circuit 122 and/or when the wireless LAN device 106 is connected to the antenna 124 via the antenna switching circuit 122.

In various embodiments, the arbitration control system 126 includes an arbitration manager 128 that is implemented to control parameters and coordinate scheduling timing between the Bluetooth device 104 and the wireless LAN device 106. The arbitration control system 126 also includes a coexistence arbiter 130 that is implemented to control point of contention decisions and control the antenna switching circuit 122 to arbitrate between Bluetooth and wireless LAN communications. Although described as components or modules of the arbitration control system 126, the arbitration manager 128 and/or the coexistence arbiter 130 can be implemented as components that are independent of the arbitration control system 126. In addition, the arbitration manager 128 and/or the coexistence arbiter 130 can be implemented together or individually as hardware, software, firmware, or any combination thereof to implement embodiments of Bluetooth and wireless LAN arbitration.

In an embodiment, the arbitration control system 126 implements slave packet suppression to arbitrate Bluetooth and wireless LAN communications for communication device 102, as described in commonly-owned U.S. patent application Ser. No. 12/370,953, entitled "Reducing Interference Between Wireless Network", which is incorporated by reference herein.

In an embodiment, the arbitration control system 126 implements an antenna lock to arbitrate Bluetooth and wireless LAN communications for communication device 102.

The wireless LAN device 106 can operate in a power save mode, and the arbitration control system 126 initiates that the antenna switching circuit 122 connects the antenna 124 to the Bluetooth device 104 for Bluetooth communication 112 when the wireless LAN device 106 operates in the power save mode. The arbitration control system 126 can also be implemented to initiate an antenna lock and initiate that the antenna switching circuit 122 connects the antenna 124 to the wireless LAN device 106 for an antenna lock duration during which a beacon transmission 132 is received from the wireless LAN access point 120.

Figure 2:
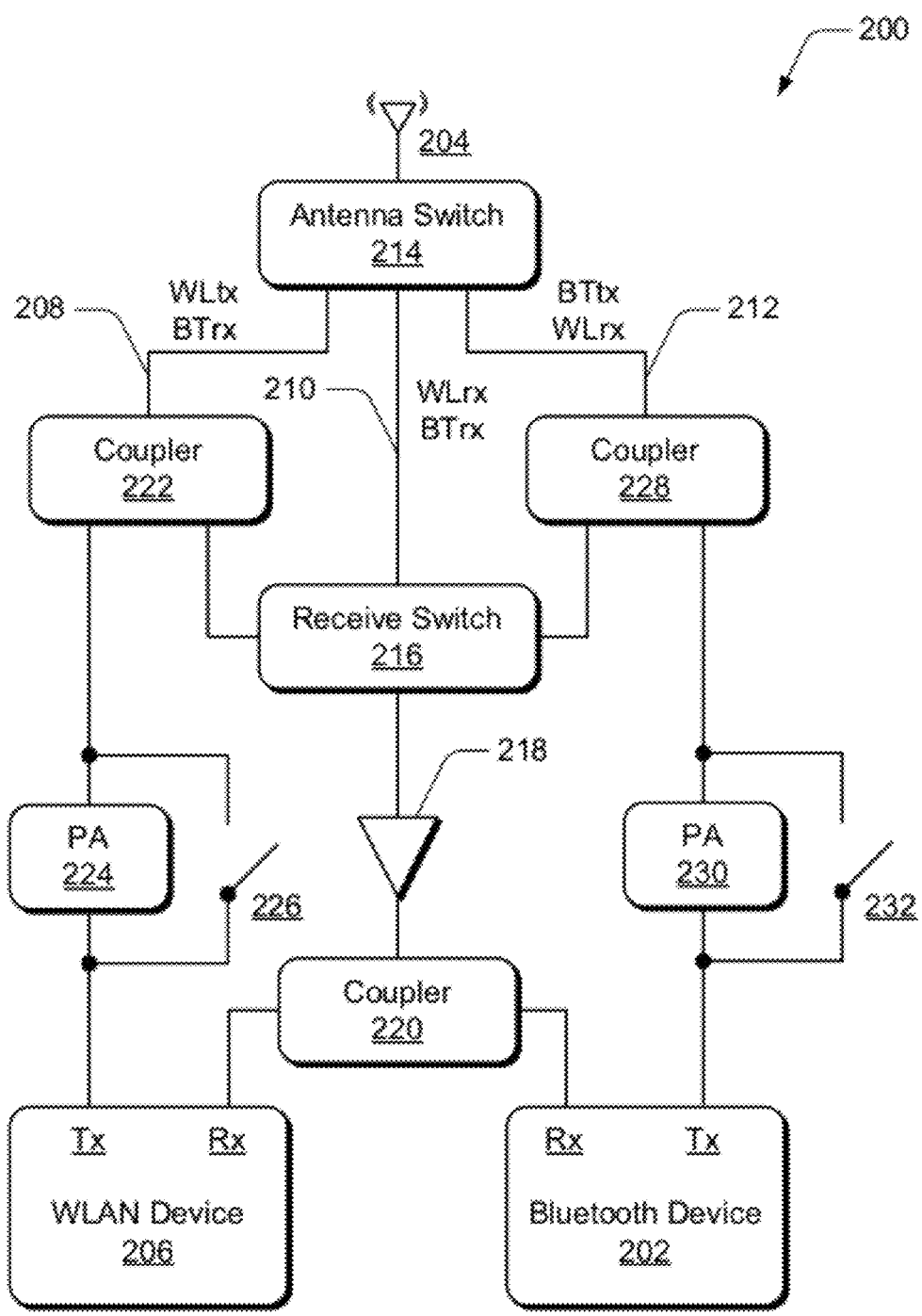
FIG. 2 illustrates an example antenna switching circuit in an embodiment of Bluetooth and wireless LAN arbitration.

FIG. 2 illustrates an example of an antenna switching circuit 200 that is implemented to arbitrate between Bluetooth and wireless LAN communications. The antenna switching circuit 200 connects a Bluetooth device 202 to an antenna 204 for Bluetooth transmission (Tx) and reception (Rx), and/or connects a wireless LAN device 206 to the antenna 204 for wireless network transmission (Tx) and reception (Rx). In an embodiment, the antenna switching circuit 200 is an example of the antenna switching circuit 122 described with reference to FIG. 1. The antenna switching circuit 200 is implemented for approximate simultaneous wireless LAN transmission and Bluetooth reception via a first communication path 208; wireless LAN reception and Bluetooth reception via a second communication path 210; and/or Bluetooth transmission and wireless LAN reception via a third communication path 212.

The antenna switching circuit 200 includes an antenna switch 214 (e.g., a SP3T switch) that connects the first communication path 208, second communication path 210, or third communication path 212 to the antenna 204. The second communication path 210 includes a receive switch 216 (e.g., a SP3T switch) and a low noise amplifier 218 for wireless LAN reception and/or Bluetooth reception via a coupler 220 that couples signals to the wireless LAN device 206 and to the Bluetooth device 202. The first communication path 208 includes a coupler 222 to the receive switch 216 for Bluetooth reception. The coupler 222 also couples to a power amplifier 224 for wireless LAN transmission, and the power amplifier 224 can be enabled or disabled by use of a bypass switch 226. Similar to the first communication path 208, the third communication path 212 includes a coupler 228 to the receive switch 216 for wireless LAN reception. The coupler 228 also couples to a power amplifier 230 for Bluetooth transmission, and the power amplifier 230 can be enabled or disabled by use of a bypass switch 232.

Figure 3:
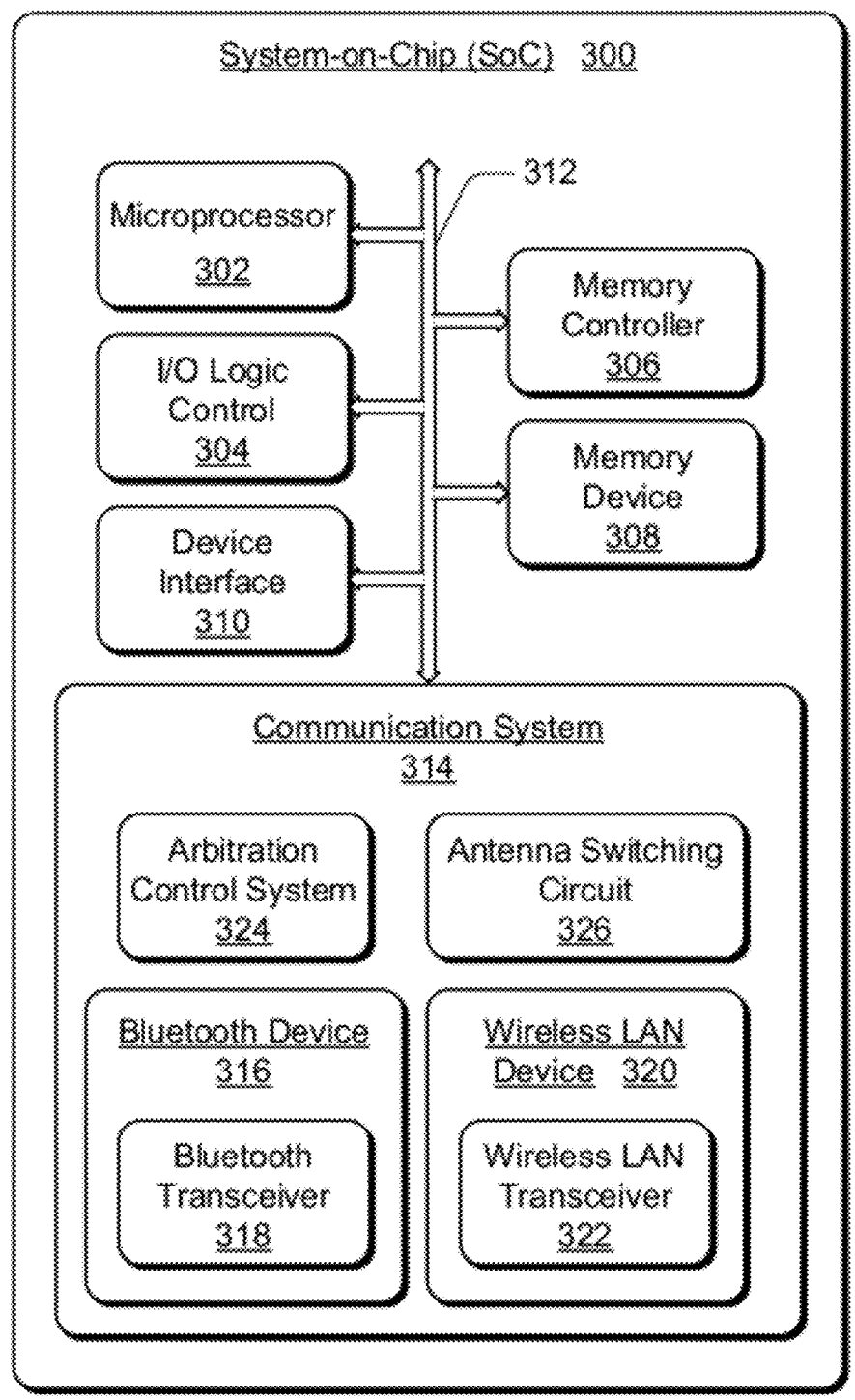
FIG. 3 illustrates an example system-on-chip (SoC) environment.

FIG. 3 illustrates an example system-on-chip (SoC) 300 to implement various embodiments of Bluetooth and wireless LAN arbitration in any type of a consumer, electronic, and/or computing device. An SoC may be implemented in a fixed or mobile device, such as any one or combination of a communication device, media device, computer device, portable telephone (e.g., cellular, VoIP, WiFi, etc.), television set-top box, video processing and/or rendering device, appliance device, gaming device, electronic device, vehicle, workstation, and/or in any other type of device that may include Bluetooth and wireless LAN functionality.

In this example, the SoC 300 is integrated with electronic circuitry, a microprocessor 302, input-output (I/O) logic control 304 (e.g., to include electronic circuitry, generally), communication interfaces and components, and other hardware, firmware, and/or software. The SoC 300 also includes a memory controller 306 and a memory device 308, such as any type of a nonvolatile memory, and/or other suitable electronic data storage devices that can be any type of flash memory device, including NAND, NOR, and NROM memory. The SoC 300 also includes a device interface 310 to interface with a device or other peripheral component, such as when installed in any of the various communication and/or computer devices described herein. In various embodiments, the SoC 300 can be implemented with any number and combination of the different components described with reference to the SoC 300. Alternatively, the SoC 300 may be implemented without any of the aforementioned components, but rather implemented with alternate components to implement embodiments of Bluetooth and wireless LAN arbitration.

The SoC 300 also includes an integrated data bus 312 that couples the various components of the SoC for data communication between the components. A data bus in the SoC can be implemented as any one or a combination of different bus structures, such as a memory bus or memory controller, an advanced system bus, a peripheral bus, a universal serial bus, and/or a processor or local bus that utilizes any of a variety of bus architectures. In addition, a device that includes SoC 300 can be implemented with any number and combination of differing components as further described with reference to the example device shown in FIG. 5.

In various embodiments of Bluetooth and wireless LAN arbitration, the SoC 300 includes a communication system 314 that implements a Bluetooth device 316 with a Bluetooth transceiver 318 for Bluetooth communication, and a wireless LAN device 320 with a wireless LAN transceiver 322 for wireless network communication. The communication system 314 also includes an arbitration control system 324 and an antenna switching circuit 326. The arbitration control system 324 can be implemented as computer-executable instructions maintained by memory device 308 and executed by microprocessor 302. Examples of the various components, functions, and/or modules, as well as corresponding functionality and features, are described with reference to the respective components of example system 100 shown in FIG. 1. Alternatively or in addition, components of the communication system 314 can be implemented as hardware, firmware, fixed logic circuitry, or any combination thereof that is implemented in connection with the I/O logic control 304 and/or other processing and control circuits of SoC 300.

An example method 400 is described with reference to FIG. 4 in accordance with one or more embodiments of Bluetooth and wireless LAN arbitration. Generally, any of the functions, methods, procedures, components, and modules described herein can be implemented using hardware (e.g., fixed logic circuitry), software, firmware, manual processing, or any combination thereof. A software implementation of a function, method, procedure, component, or module represents program code that performs specified tasks when executed on a computing-based processor. The example method(s) may be described in the general context of computer-executable instructions, which can include software, applications, routines, programs, objects, components, data structures, procedures, modules, functions, and the like.

Figure 4:
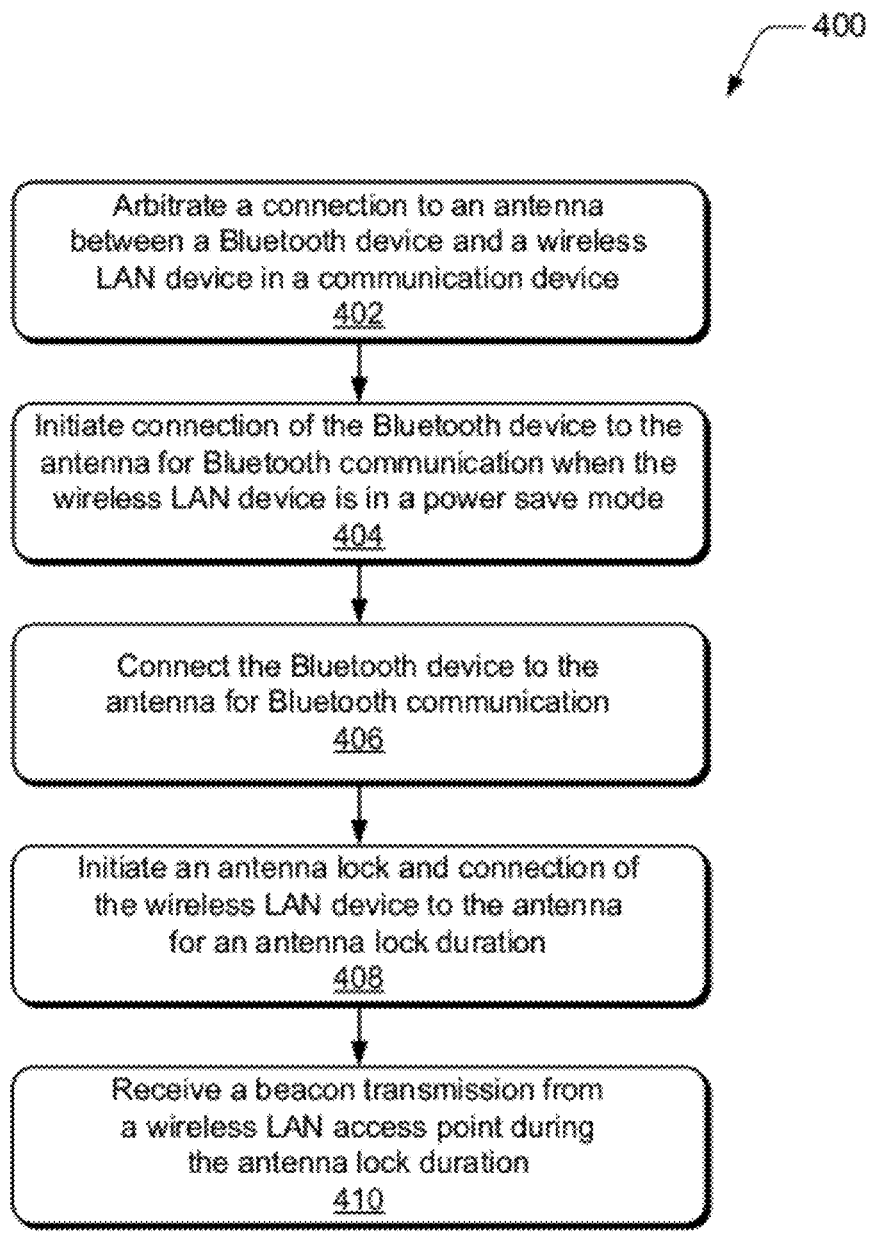
FIG. 4 illustrates an example method of Bluetooth and wireless LAN arbitration.

FIG. 4 illustrates an example method 400 of Bluetooth and wireless LAN arbitration, and is directed to an antenna lock. The order in which the method is described is not intended to be construed as a limitation, and any number of the described method blocks can be combined in any order to implement the method, or an alternate method.

At block 402, a connection to an antenna is arbitrated between a Bluetooth device and a wireless LAN device in a communication device. For example, the arbitration control system 126 at communication device 102 arbitrates connecting the Bluetooth device 104 to the antenna 124 for Bluetooth communication 112 and connecting the wireless LAN device 106 to the antenna 124 for network communication 118. The arbitration control system 126 controls an antenna switching circuit 122 that connects the Bluetooth device 104 to the antenna 124 for Bluetooth communication and connects the wireless LAN device 106 to the antenna 124 for network communication.

At block 404, connection of the Bluetooth device to the antenna is initiated for Bluetooth communication when the wireless LAN device operates in a power save mode. For example, the arbitration control system 126 at communication device 102 initiates the antenna switching circuit 122 to connect the antenna 124 to the Bluetooth device 104 for Bluetooth communication 112 when the wireless LAN device 106 operates in a power save mode.

At block 406, the Bluetooth device is connected to the antenna for Bluetooth communication. For example, the antenna switching circuit 122 connects the Bluetooth device 104 to the antenna 124 for Bluetooth communication 112. At block 408, an antenna lock and connection of the wireless LAN device to the antenna is initiated for an antenna lock duration. For example, the arbitration control system 126 at communication device 102 initiates an antenna lock and connection of the wireless LAN device 106 to the antenna 124 for an antenna lock duration.

At block 410, a beacon transmission is received from a wireless LAN access point during the antenna lock duration. For example, the wireless LAN device 106 at communication device 102 receives the beacon transmission 132 from the wireless LAN access point 120 during the antenna lock duration when the wireless LAN device 106 is connected to the antenna 124 as initiated by the arbitration control system 126.

Figure 5:
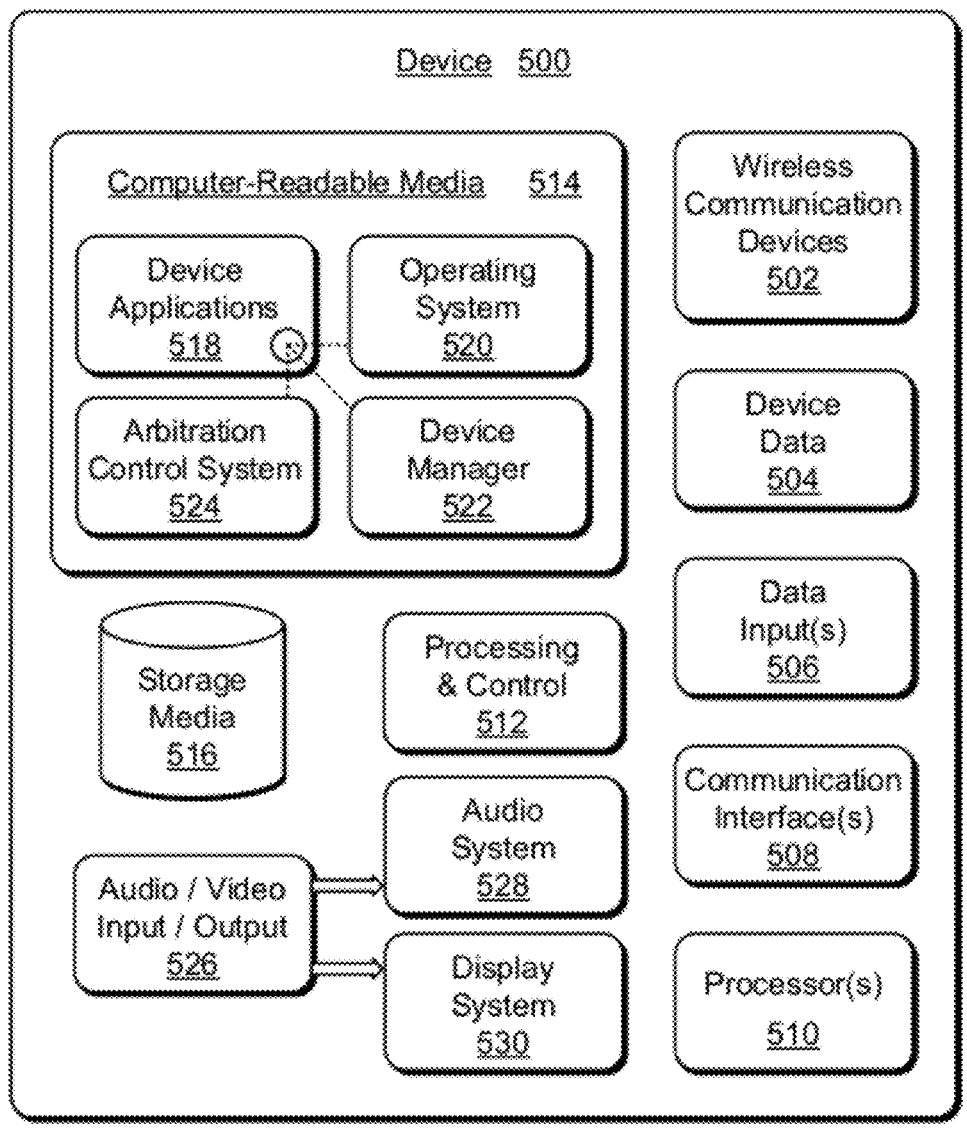
FIG. 5 illustrates various components of an example device.

FIG. 5 illustrates various components of an example device 500 that can be implemented as any type of device that includes wireless communication components and/or implements various embodiments of Bluetooth and wireless LAN arbitration. For example, device 500 can be implemented to include the example communication system of communication device 102 as shown in FIG. 1 and/or can include the system-on-chip (SoC) 300 shown in FIG. 3. In various embodiments, device 500 may be implemented as any one or combination of a wired and/or wireless device, media device, computer device, communication device, portable telephone (e.g., cellular, VoIP, WiFi, etc.), television set-top box, video processing and/or rendering device, appliance device, gaming device, electronic device, vehicle, workstation, access point, and/or as any other type of device. Device 500 may also be associated with a user (i.e., a person) and/or an entity that operates the device such that a device describes logical devices that include users, software, firmware, and/or a combination of devices.

Device 500 includes wireless communication devices 502 (e.g., a Bluetooth device and/or a wireless LAN device) that enable wireless communication of device data 504 (e.g., received data, data that is being received, data scheduled for broadcast, data packets of the data, etc.). The device data 504 or other device content can include configuration settings of the device and/or information associated with a user of the device. Device 500 also includes one or more data inputs 506 via which any type of data, media content, and/or inputs can be received, such as user-selectable inputs and any other type of audio, video, and/or image data.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices can communicate data with device 500.

Device 500 includes one or more processors 510 (e.g., any of microprocessors, controllers, and the like) which process various computer-executable instructions to control the operation of device 500, to communicate with other electronic and computing devices, and to implement embodiments of Bluetooth and wireless LAN arbitration. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager 522 (e.g., a control application, software application, signal processing and control module, code that is native to a particular device, a hardware abstraction layer for a particular device, etc.). The device applications 518 also include an arbitration control system 524 when device 500 implements various embodiments of Bluetooth and wireless LAN arbitration. In this example, the device applications 518 are shown as software modules and/or computer applications. Alternatively or in addition, the arbitration control system 524 can be implemented as hardware, software, firmware, or any combination thereof.

Device 500 can also include an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

Although embodiments of Bluetooth and wireless LAN arbitration have been described in language specific to features and/or methods, it is to be understood that the subject of the appended claims is not necessarily limited to the specific features or methods described. For example, one or more method blocks of the methods described above can be performed in a different order (or concurrently) and still achieve desirable results. Moreover, the specific features and methods are disclosed as example implementations of Bluetooth and wireless LAN arbitration. In addition, various techniques for arbitrating between two different communication schemes are described above in connection with Bluetooth and wireless LAN communications, the techniques are applicable for arbitrating between other types of communication schemes.

The invention claimed is:

1. A communication device, comprising:
    a Bluetooth device configured for Bluetooth communication according to Bluetooth protocol;
    a wireless LAN device configured for network communication according to wireless network protocol;
    an antenna switching circuit configured to connect the Bluetooth device to an antenna for the Bluetooth communication via one of three different communication paths and further configured to connect the wireless LAN device to the antenna for the network communication via the same or another of the three different communication paths, each of the three different communication paths:
        being connectable to the antenna via a single-pole triple-throw (SP3T) switch directly coupled to the antenna;
        having respective receive portions that are connectable to a reception coupler via another SP3T switch, the reception coupler operably coupled to respective receive ports of the wireless LAN device and Bluetooth device; and
        configured to respectively enable:
            Bluetooth reception and wireless LAN transmission;
            Bluetooth reception and wireless LAN reception; or
            Bluetooth transmission and wireless LAN reception; and
    an arbitration control system configured to arbitrate when the Bluetooth device is connected to the antenna via the antenna switching circuit and when the wireless LAN device is connected to the antenna via the antenna switching circuit,
    wherein the wireless LAN device is further configured to operate in a power save mode, and
    wherein the arbitration control system is further configured to initiate that the antenna switching circuit connect the antenna to the Bluetooth device for the Bluetooth communication when the wireless LAN device operates in the power save mode.

2. The communication device of claim 1, wherein the arbitration control system is further configured to initiate an antenna lock and cause the antenna switching circuit to connect the antenna to the wireless LAN device for an antenna lock duration during which a beacon transmission is received from a wireless LAN access point.

3. The communication device of claim 1, wherein the communication device comprises one or more of a media device, communication device, computer device, gaming device, appliance device, electronic device, or a portable phone.

4. The communication device of claim 1, wherein the wireless network protocol is compliant with an IEEE 802.11 standard.

5. A method, comprising:
    connecting, via one of three different communication paths of an antenna switching circuit, a Bluetooth device to an antenna of a communication device for Bluetooth communication according to Bluetooth protocol;
    connecting, via the same or another of the three different communication paths of the antenna switching circuit, a wireless LAN device to the antenna of the communication device for network communication according to wireless network protocol, each of the three different communication paths:
  being connectable to the antenna via a first single-pole triple-throw (SP3T) switch directly coupled to the antenna;
  having respective receive portions that are connectable to a reception coupler via a second SP3T switch, the reception coupler operably coupled to respective receive ports of the wireless LAN device and Bluetooth device; and
  configured to respectively enable:
    Bluetooth reception and wireless LAN transmission;
    Bluetooth reception and wireless LAN reception; or
    Bluetooth transmission and wireless LAN reception;
arbitrating when the Bluetooth device is connected to the antenna via the antenna switching circuit and when the wireless LAN device is connected to the antenna via the antenna switching circuit; and
initiating connection of the Bluetooth device to the antenna for the Bluetooth communication when the wireless LAN device operates in a power save mode.

6. The method as recited in claim 5, further comprising:
  initiating an antenna lock and connection of the wireless LAN device to the antenna for an antenna lock duration; and
  receiving a beacon transmission from a wireless LAN access point during the antenna lock duration.

7. The method as recited in claim 5, wherein each of the three different communication paths of the antenna switching circuit enable approximately simultaneous Bluetooth and wireless LAN communication.

8. The method as recited in claim 5, wherein the wireless network protocol is compliant with an IEEE 802.11 standard.

9. The method as recited in claim 5, wherein the communication device comprises one or more of a media device, computer device, gaming device, appliance device, electronic device, or portable phone.

10. The method as recited in claim 5, wherein the different path configured to respectively enable Bluetooth reception and wireless LAN reception is connected from the first SP3T switch, directly to the second SP3T switch.

11. The method as recited in claim 5, wherein the second SP3T switch is connected to the reception coupler via a low-noise amplifier configured to amplify received communications.

12. A System-on-Chip (SoC) comprising:
  a Bluetooth communication block configured for Bluetooth communication according to Bluetooth protocol;
  a wireless LAN communication block configured for network communication according to wireless network protocol;
  an antenna switching circuit configured to connect the Bluetooth communication block to an antenna for the Bluetooth communication via one of three different communication paths and further configured to connect the wireless LAN communication block to the antenna for the network communication via the same or another of the three different communication paths, each of the three different communication paths:
    being connectable to the antenna via a first single-pole triple-throw (SP3T) switch operably coupled to the antenna;
    having respective receive portions that are connectable to a reception coupler via a second SP3T switch, the reception coupler operably coupled to respective receive ports of the wireless LAN device and Bluetooth device; and
    configured to respectively enable:
      Bluetooth reception and wireless LAN transmission;
      Bluetooth reception and wireless LAN reception; or
      Bluetooth transmission and wireless LAN reception; and
  an arbitration controller configured to arbitrate when the Bluetooth communication block is connected to the antenna via the antenna switching circuit and when the wireless LAN communication block is connected to the antenna via the antenna switching circuit.

13. The SoC of claim 12, wherein the wireless LAN communication block is further configured to operate in a power save mode.

14. The SoC of claim 13, wherein the arbitration controller is further configured to cause the antenna switching circuit to connect the antenna to the Bluetooth communication block for the Bluetooth communication when the wireless LAN communication block operates in the power save mode.

15. The SoC of claim 12, wherein the antenna is directly connected to the first single-pole-triple-throw (SP3T) switch of the antenna switching circuit.

16. The SoC of claim 12, wherein the SoC is embodied in a communication device comprising a media device, computer device, gaming device, appliance device, electronic device, or portable phone.

17. The SoC of claim 12, wherein each of the three different communication paths of the antenna switching circuit enable approximately simultaneous Bluetooth and wireless LAN communication.

18. The SoC of claim 12, wherein the wireless network protocol is compliant with an IEEE 802.11 standard.

19. The communication device of claim 1, wherein at least one of the communication paths is connected from the first SP3T switch directly to the second SP3T switch.

20. The communication device of claim 1, wherein each of the three different communication paths of the antenna switching circuit enable approximately simultaneous Bluetooth and wireless LAN communication.

* * * * *